P. J. RUDDY.
MAGNETIC AERIAL APPARATUS.
APPLICATION FILED FEB. 24, 1916.
1,255,646.
Patented Feb. 5, 1918.
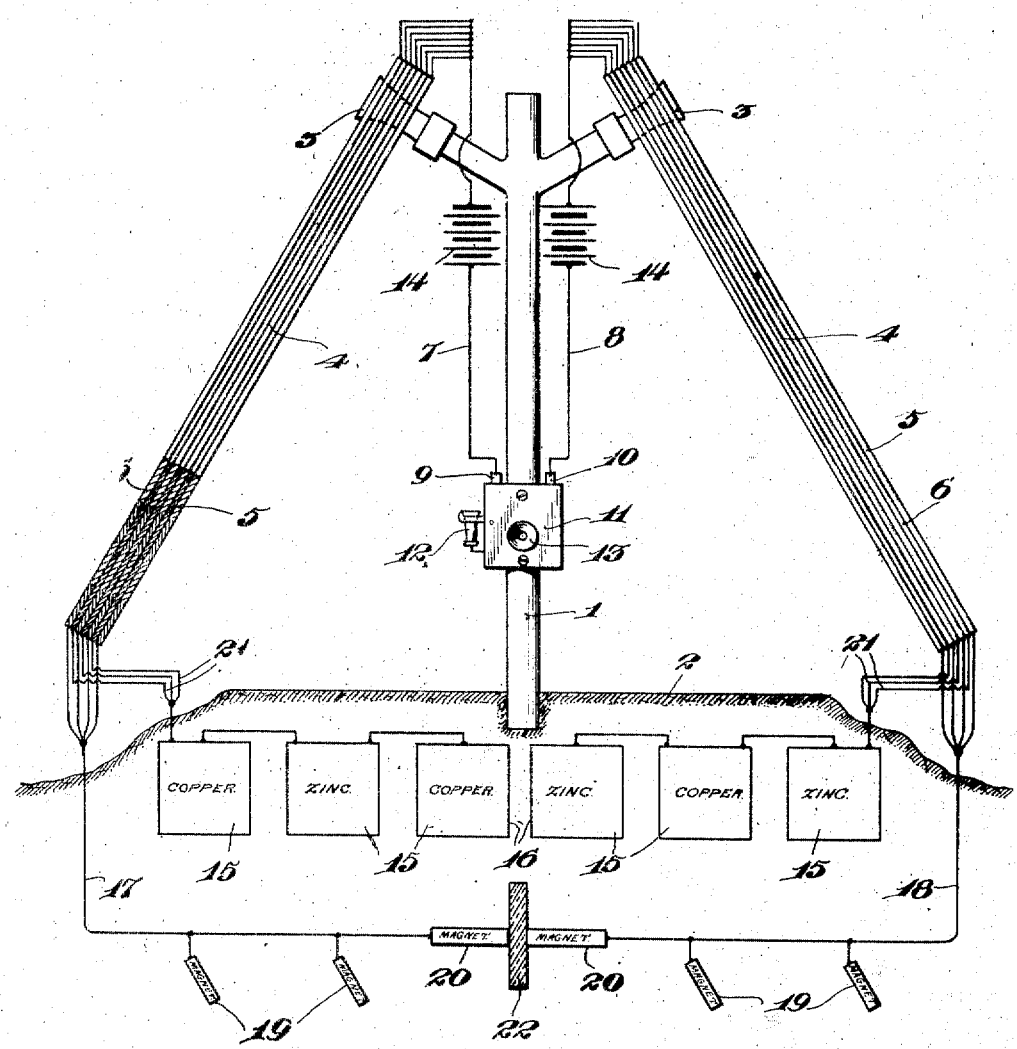
Witness
Wm. Conway.
C. R. Ziegler.
Inventor
Patrick J. Ruddy
By Joshua R. H. Potts
his Attorney

UNITED STATES PATENT OFFICE.

PATRICK J. RUDDY, OF CENTRALIA, PENNSYLVANIA.

MAGNETIC AERIAL APPARATUS.

1,255,646.   Specification of Letters Patent.   Patented Feb. 5, 1918.

Application filed February 24, 1916. Serial No. 80,185.

*To all whom it may concern:*

Be it known that I, PATRICK J. RUDDY, a citizen of the United States, residing at Centralia, in the county of Columbia and State of Pennsylvania, have invented certain new and useful Improvements in Magnetic Aerial Apparatus, of which the following is a specification.

My invention relates to improvements in magnetic aerial apparatus, and more particularly to an aerial telephone in which magnets are utilized to cause high oscillating currents and reproduce and magnify similar vibrations in the air and earth so that sounds may be received and sent.

An object of the invention is to provide an improved aerial apparatus composed of steel wires, spaced apart by good electric conductors, and each steel wire divided into a plurality of magnets with poles alternating, and so arrange the magnets that the plus and minus poles shall be together, or in other words, plus to plus, and minus to minus to compound magnets and provide improved means for preventing the passage of electric currents through the magnetized wires.

With these and other objects in view, the invention consists in certain novel features of construction and combinations and arrangements of parts as will be more fully hereinafter described and pointed out in the claims.

The accompanying drawing is a diagrammatic view partly in elevation illustrating my improvements.

1 is a post supported in the ground 2, and having insulators 3 which support aerial cables 4. These aerial cables 4 are composed of alternate steel and copper wires 5 and 6. The steel wires are magnetized plus and minus throughout their length. In other words, each steel wire is divided into a plurality of oppositely magnetized sections arranged plus to plus and minus to minus, with all of the magnetized sections across the cable magnetized alike.

I have illustrated at the left of the figure, a section of the aerial cable which shows by section lining the oppositely magnetized sections of the steel wires, and it is to be understood that these sections may be of various lengths and variously arranged to set up vibrations in the electro-magnetic waves and magnify such waves as they are caught by the aerial cables.

The cables 4 and 5 at their upper ends are connected by wires 7 and 8 with the poles 9 and 10 of a telephone box 11; the latter supporting a receiver 12 and transmitter 13. The wires 7 and 8 are provided between their ends with electric batteries or other sources of electricity 14.

The copper wires 6 of the aerial cables 4, at their lower ends, are electrically connected by wires 21 to plates 15 in the ground 2. These plates 15 are alternately copper and zinc and are arranged north and south in the ground, but may be of other materials and differently arranged to suit conditions. A gap shown at 16, is provided between two of the plates, and this gap maintains an open circuit, and the distance of the gap may vary with the strength of the current of the sending instrument.

The steel wires 5 of the aerial cables 4 are electrically connected to wires 17 and 18 respectively. These wires 17 are provided with bar magnets 19, which project into the ground at the proper angle indicated by an ordinary dipping needle. Other magnets 20 are secured to the wires 17 and 18 respectively, and are spaced apart by a glass plate 22, which prevents any passage of electric current through the wires 18, but does not interfere with the transmission of magnetic waves.

It will thus be noted that with my improved apparatus, the magnets 19 and 20 in the ground accumulate electro-magnetic waves, and the electro-magnetic waves in the air are taken up and increased or magnified by the arrangement of alternate magnets of the aerial cables 4 and 5.

The arrangement of copper wires or other good electric conductor overcomes any resistance which might otherwise occur in the steel wires, and the latter by reason of their arrangement of magnets insure a rapid vibration to operate the receiver 12 of the telephone 11 or send out vibrations from the transmitter 13.

While I have referred to the wires 6 as of copper, it , of course to be understood that I may use other forms of electric conductor, and while I have referred to the parts 5 and 6 as wires, they may be variously made to produce the desired results.

In any event they will be arranged alternately, the magnets and good conductors, and are preferably positioned as shown, and the height of the apparatus can be varied to suit conditions.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a magnetic aerial apparatus of the character described, the combination with a support, and aerial cables, said cables comprising a plurality of alternately arranged magnets, substantially as described.

2. In a magnetic aerial apparatus of the character described, the combination with a support, and aerial cables, said cables comprising a plurality of alternately arranged magnets, and good electric conductors between the magnets, substantially as described.

3. In an apparatus of the character described, the combination with two aerial cables, said cables comprising a plurality of oppositely arranged magnets, magnets located in the ground and connected to the cables, and a sheet of glass spacing the magnets apart in the ground, substantially as described.

4. In a magnetic aerial apparatus of the character described, the combination with a support, and aerial cables, said cables comprising a plurality of alternately arranged magnets, a telephone, and wires connecting the poles of the telephone with the aerial cables, substantially as described.

5. In a magnetic aerial apparatus of the character described, the combination with a support, and aerial cables, said cables comprising a plurality of alternately arranged magnets, good electric conductors between the magnets, a telephone, and wires connecting the poles of the telephone with the aerial cables, substantially as described.

6. In an apparatus of the character described, the combination with two aerial cables, said cables comprising a plurality of oppositely arranged magnets, magnets located in the ground and connected to the cables, a sheet of glass spacing the magnets apart in the ground, a telephone, and wires connecting the poles of the telephone with the aerial cables, substantially as described.

7. In a magnetic aerial apparatus of the character described, the combination with a support, and aerial cables, said cables comprising a plurality of alternately arranged magnets, a telephone, wires connecting the poles of the telephone with the aerial cables, electric batteries electrically connected to said last-mentioned wires, alternately arranged zinc and copper plates in the ground connected electrically with the cables, and two of said plates spaced apart forming a gap between them, substantially as described.

8. In a magnetic aerial apparatus of the character described, the combination with a support, and aerial cables, said cables comprising a plurality of alternately arranged magnets, good electric conductors between the magnets, a telephone, and wires connecting the poles of the telephone with the aerial cables, electric batteries electrically connected to said last-mentioned wires, alternately arranged zinc and copper plates in the ground connected electrically with the cables, and two of said plates spaced apart forming a gap between them, substantially as described.

9. In an apparatus of the character described, the combination with two aerial cables, said cables comprising a plurality of oppositely arranged magnets, magnets located in the ground and connected to the cables, a sheet of glass spacing the magnets apart in the ground, a telephone, and wires connecting the poles of the telephone with the aerial cables, electric batteries electrically connected to said last-mentioned wires, alternately arranged zinc and copper plates in the ground connected electrically with the cables, and two of said plates spaced apart forming a gap between them, substantially as described.

In testimony whereof I have signed my name to this specification in the presence of two subscribing witnesses.

PATRICK J. RUDDY.

Witnesses:
AMBROSE D. GOLDSWORTHY,
CHALMERS S. HENDERSON.